Figure 1:
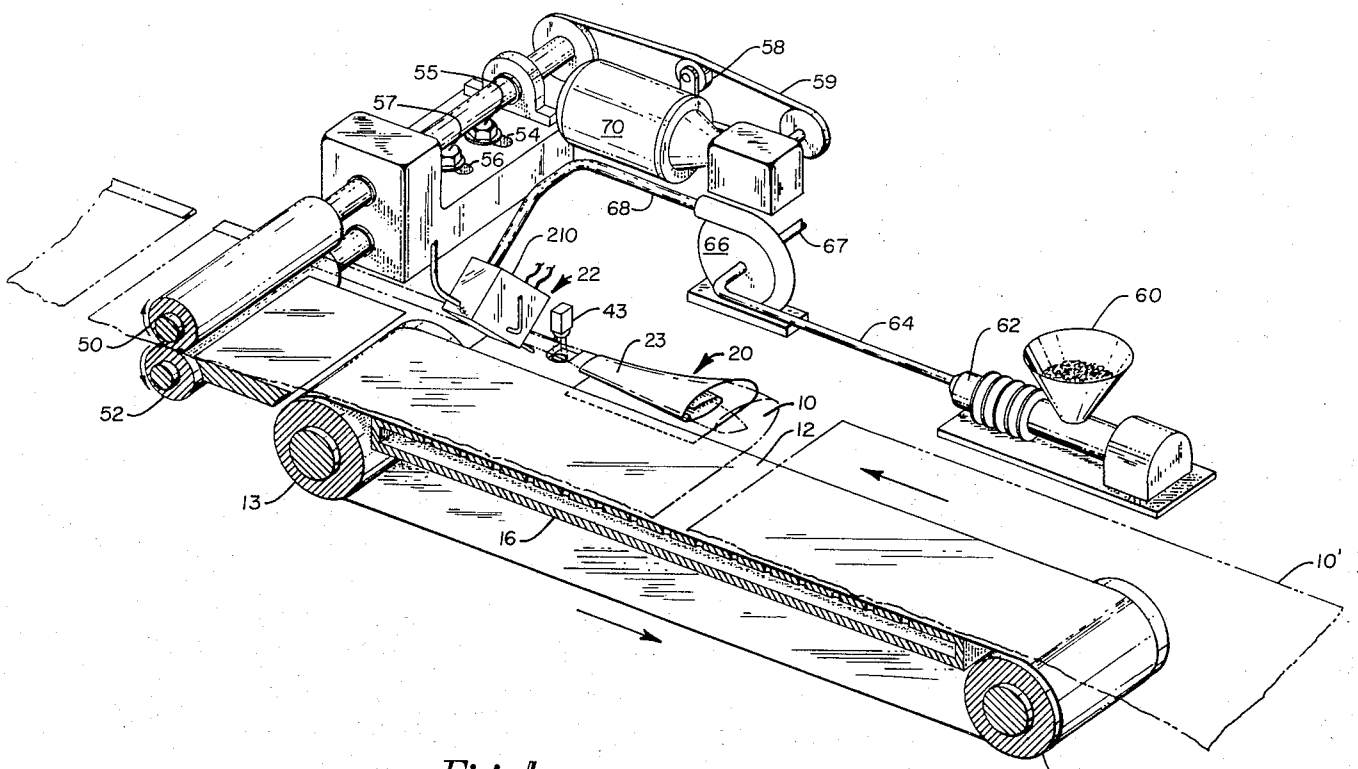
Figure 2:
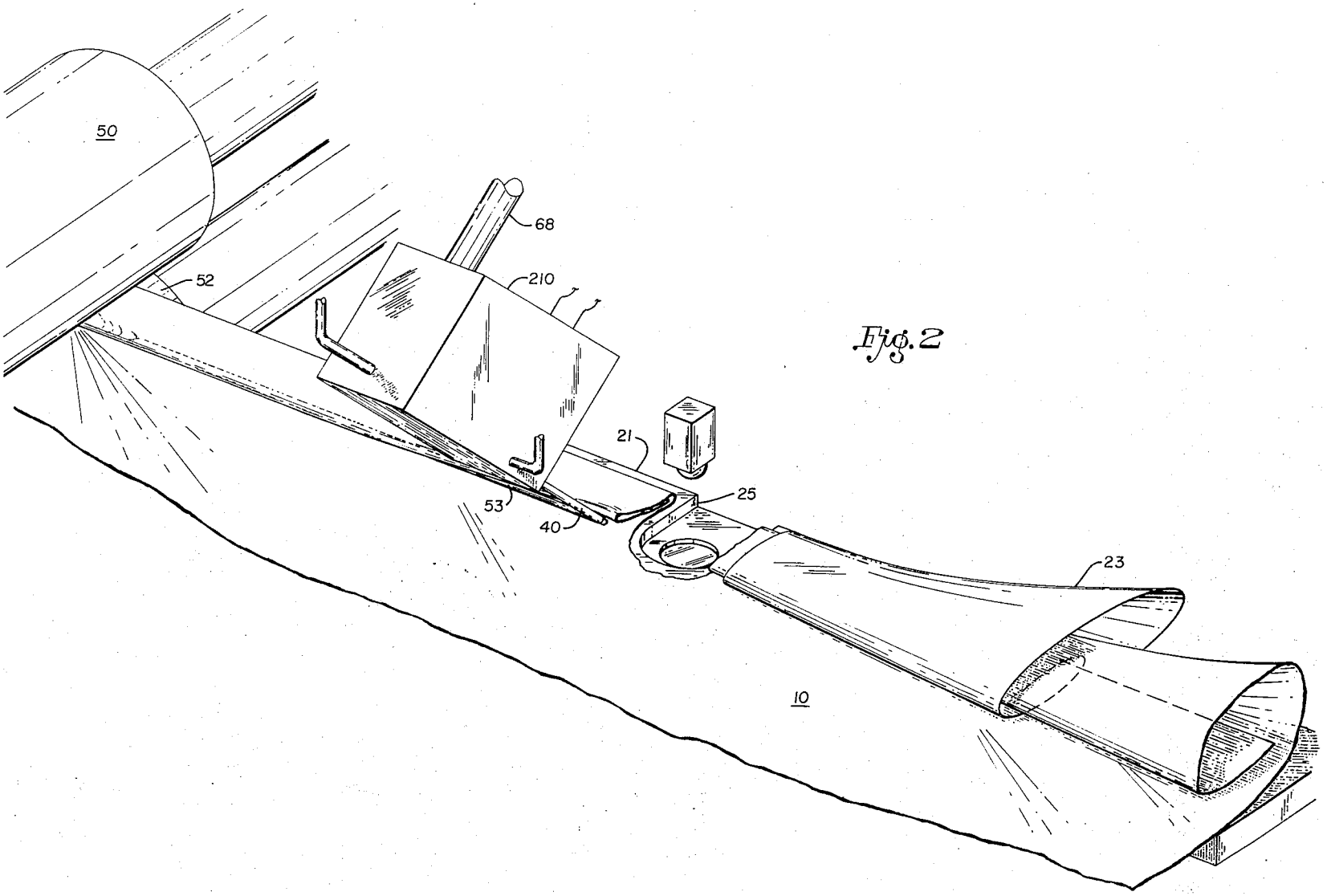
Figure 3:
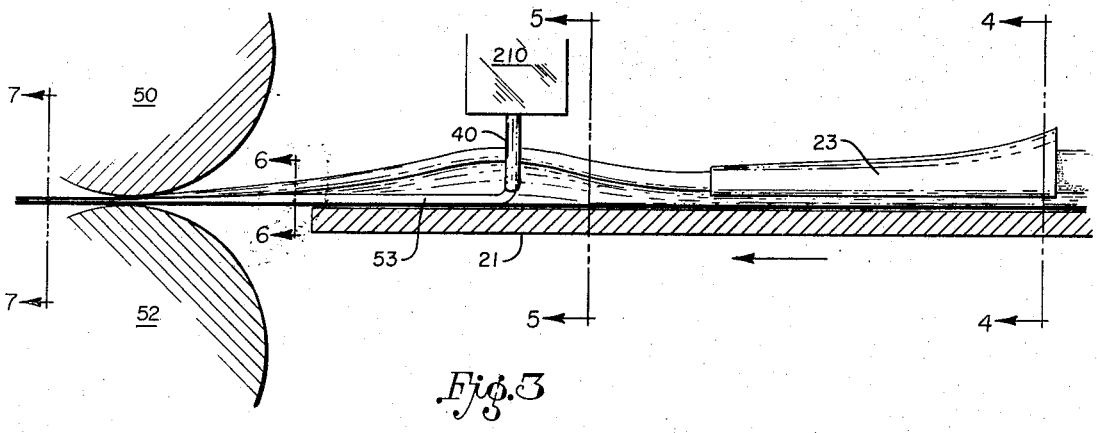
Figure 5:
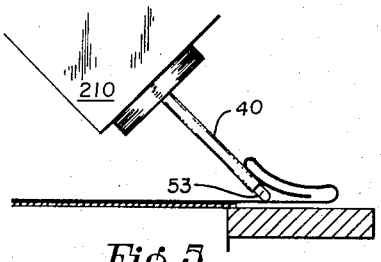
Figure 4:
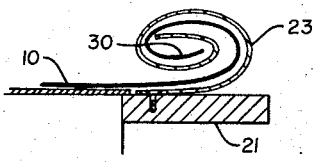
Figure 6:
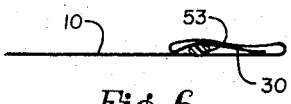
Figure 7:
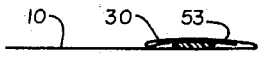
Figure 8:
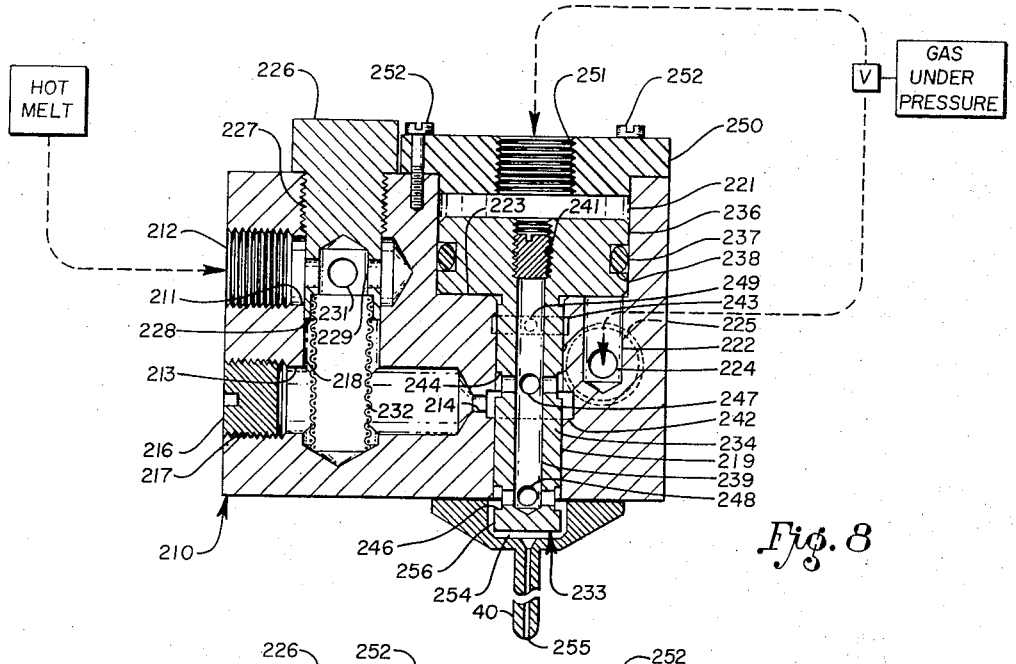
Figure 9:
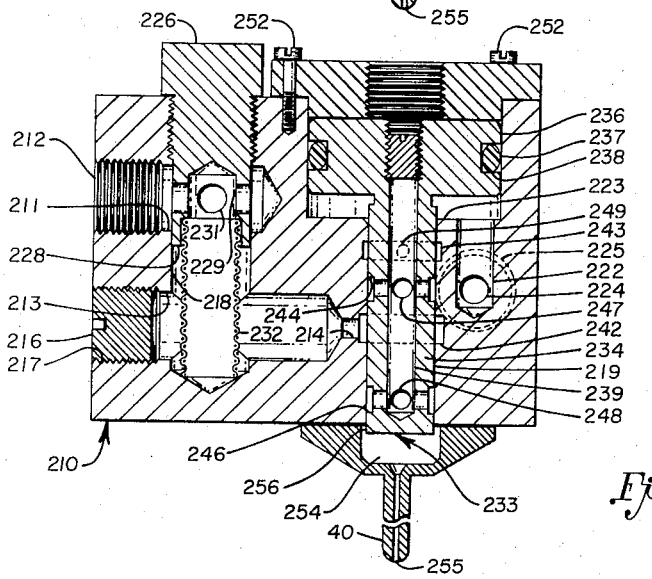

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 3, 1974

926 O.G. 11

T926,010

APPARATUS AND METHOD FOR SEAMING MATERIAL WITH HOT MELT ADHESIVE

Robert M. Elliott, Rte. 4, Wines Circle, Blountville, Tenn. 37617; Cecil W. Dolen, 1805 Manor Court, Apt. C, Kingsport, Tenn. 37660; and Ernest L. Myers, Rte. 1, Hiltons, Va. 24258

Continuation of abandoned application Ser. No. 231,844, Mar. 6, 1972. This application Jan. 9, 1974, Ser. No. 438,106

Int. Cl. B29c *27/10*

U.S. Cl. 156—202

4 Sheets Drawing. 16 Pages Specification

An apparatus and method for bonding plies of sheet material, especially fabric material, using a hot melt adhesive are disclosed. An in-line sequence of operations includes bringing a ply of sheet material into overlying, aligned position with another ply, applying a bead of hot melt adhesive to one of the plies at a position where the seam is desired, and finally pressing the plies together prior to solidification of the adhesive to cause the hot melt to partially penetrate the plies. Provision is made for quickly

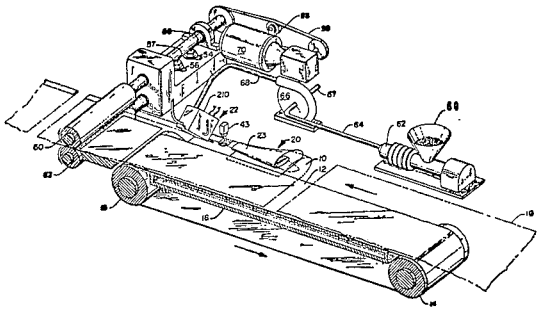

and accurately beginning and terminating the bead of hot melt adhesive.